United States Patent Office 2,886,984
Patented May 19, 1959

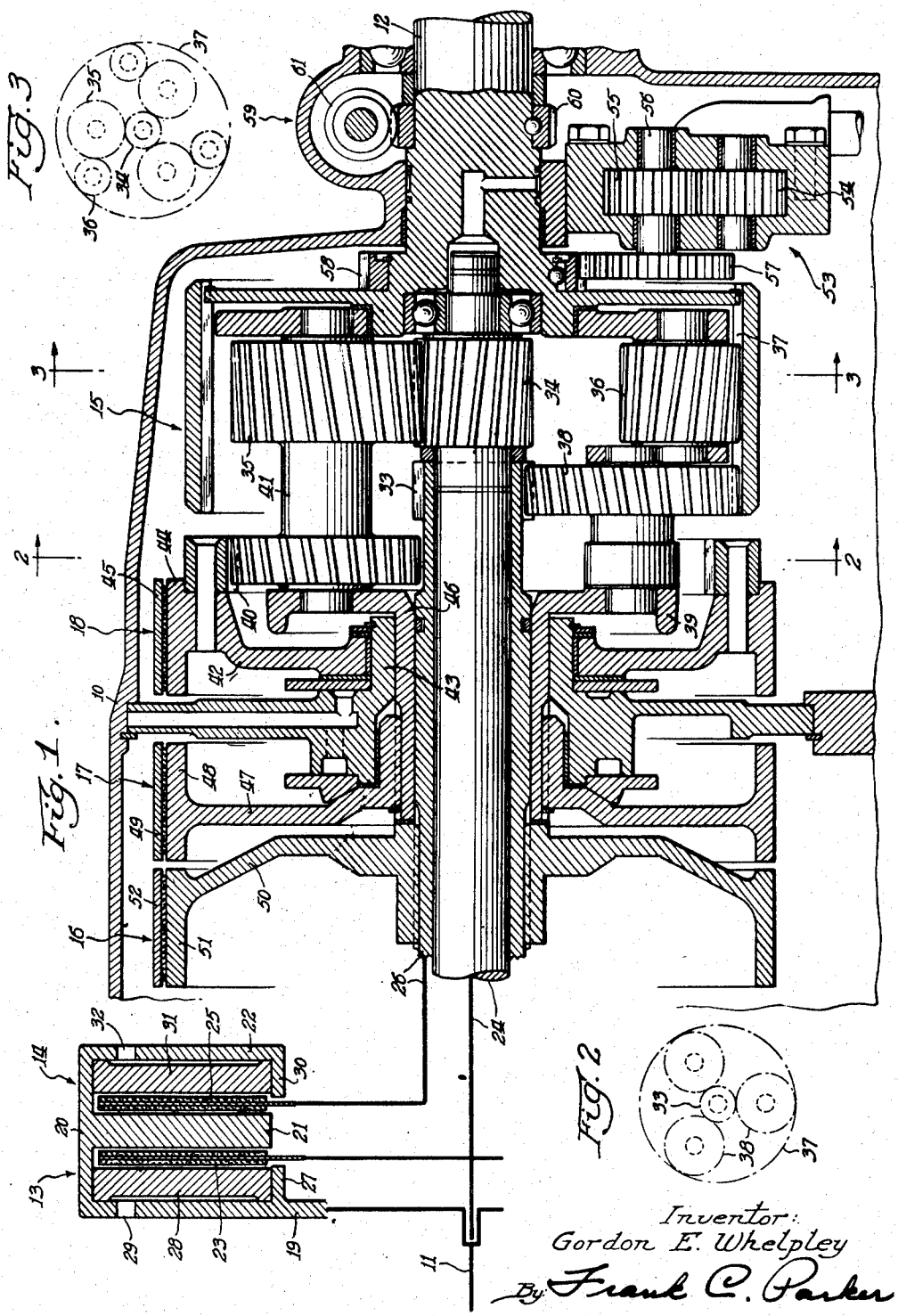

2,886,984
TRANSMISSION

Gordon E. Whelpley, Northbrook, Ill., assignor to Borg-Warner Corporation, Chicago, Ill., a corporation of Illinois Continuation of application Serial No. 228,046, May 24, 1951. This application June 10, 1955, Serial No. 514,516

3 Claims. (Cl. 74—759)

The present invention relates generally to transmissions and more particularly to truck transmissions employing compound planetary gearing.

This application is a continuation-in-full of my application, Serial No. 228,046, filed May 24, 1951, now abandoned.

The principal object of the present invention is to provide a transmission suitable for use in trucks which will provide four forward speed drives and one reverse drive between the engine crankshaft and the driven wheels of the vehicle.

A further object of the invention is to provide a planetary gearing type transmission which utilizes a pair of fluid pressure operated friction clutches which are selectively operable for connecting the engine crankshaft with either or both of a pair of input elements of the planetary gearing, and three friction type brakes for respectively braking different reaction elements of the planetary gearing for thereby completing any one of the different drives through the transmission.

The planetary gearing utilized in the present transmission includes a pair of sun gears which are selectively connectible to the drive shaft and which are respectively connectible with the driven shaft through a pair of meshing pinions and a ring gear and through a single pinion and the same ring gear. All of the pinions are carried by a single planetary gear carrier and a second reaction ring gear is provided and meshes with one of the pinions of the pair of meshing pinions. One of the sun gears, that is, the sun gear which is in mesh with the single pinion, the carrier and the second ring gear are selectively braked in order to complete the different drives through the transmission. The brakes for holding the reaction ring gear, the carrier and the reaction sun gear stationary are all of the fluid pressure actuated type.

The above and numerous other objects and numerous advantages will become apparent from the following detailed description when read in conjunction with the accompanying drawing wherein:

Fig. 1 shows the principal features of the invention;

Fig. 2 is a sectional view taken substantially along the line 2—2 in Fig. 1, and looking in the direction of the arrows; and Fig. 3 is a sectional view taken substantially along the line 3—3 in Fig. 1 and looking in the direction of the arrows.

With reference to the drawing, the transmission is enclosed in a casing 10, which is shown only fragmentarily, and includes a drive shaft 11 and a driven shaft 12. The drive shaft 11 may be connected directly to the crankshaft of the vehicle engine or it may constitute the driven element of a hydrodynamic torque transmitting device which itself is interposed between the vehicle engine and the transmission mechanism shown herein. The driven shaft 12 is adapted to drive the driven wheels of the vehicle. The transmission also includes a pair of fluid pressure operated clutches 13 and 14, both of which are shown schematically, for selectively driving either of two input elements of a planetary gear set 15. Three control brakes 16, 17 and 18 are provided for respectively braking different reaction elements in the planetary gear set 15.

A disc 19, secured to the drive shaft 11, has an axially extending flange 20 and secured to the flange 20 are a pair of plates or radially inwardly extending members 21 and 22. As is apparent, all of the members 19, 20, 21 and 22 are integrally formed. A friction disc 23, secured to an intermediate shaft 24, is disposed between the members 19 and 21 and a friction disc 25, secured to an intermediate sleeve shaft 26 is disposed between the members 21 and 22. The disc 19 is formed with a short axially extending flange 27, which together with the flange 20 form a cylinder for receiving a piston 28. A fluid pressure conduit 29 is provided for admitting fluid under pressure into the cylinder behind the piston 28 so as to move the piston 28 to the right and cause it to press the friction member 23 against the plate 21 and thereby connect the intermediate shaft 24 with the drive shaft 11. The member 22 is provided with an axially extending flange 30, which together with the flange 20 form a cylinder for receiving a piston 31 and when fluid under pressure is admitted through a conduit 32 behind the piston 31, the piston 31 is moved to the left to thereby press the friction plate 25 against the plate 21 and thus connect the intermediate sleeve shaft 26 with the drive shaft 11.

The planetary gearing 15 comprises two input sun gears 33 and 34, connected respectively to the intermediate shafts 26 and 24, a set of three divided planetary pinions 35 which mesh with the sun gear 34, a set of three planetary pinions 36 which mesh with the pinions 35, a ring gear 37 which meshes with the pinions 36 and which is splined to the driven shaft 12, a set of three planetary pinions 38 which mesh with both the sun gear 33 and the ring gear 37, a planetary pinion carrier 39 for rotatably mounting all of the pinions 35, 36 and 38, and a ring gear 40 which meshes with the pinions 35. It will be noted that the divided pinions 35 are cut out, as at 41 so as to provide sufficient space for the pinions 38.

The ring gear 40 is rigidly connected to an annular member 42 which is rotatable about a stationary member 43 concentric with the intermediate shafts 24 and 26 and which is formed with a drum portion 44 around its periphery. The drum 44 comprises the rotatable member of the friction brake 18 and is designed so as to be engaged by a brake band 45 in order to hold the ring gear 40 stationary. The planetary pinion carrier 39 is formed integrally with a sleeve shaft 46 rotatable around the intermediate sleeve shaft 26. An annular member 47 is splined to the sleeve shaft 46 and has a brake drum 48 forming its outer periphery. The brake drum 48 comprises the rotatable element of the brake 17 and is designed to be engaged by a brake band 49 in order to hold the planetary pinion carrier 39 stationary. The intermediate shaft 26 has an annular member 50 splined thereto and this member 50 is also formed with a peripheral drum 51 which forms the rotatable element of the friction brake 16. The friction brake 16 also includes a brake band 52 which upon contraction engages the drum 51 in order to hold the intermediate shaft 26 and the sun gear 33 stationary.

As has already been stated, each of the brakes 16, 17 and 18 are actuated by a fluid pressure operated motor (none of these motors being shown) and fluid under pressure for operating these motors is supplied by means of a fluid pump driven by the drive shaft 11 and a fluid pump 53 driven by the driven shaft 12. The fluid pump 53 comprises a pair of meshing pinions 54 and 55, the pinion 55 being secured to the shaft 56 which is formed integrally with a gear 57, and which meshes with a gear 58 rotatable with the driven shaft 12. Speedometer gearing 59 is also provided and comprises a pinion 60 splined to the driven shaft 12 and a worm gear 61 in mesh with the pinion 60.

The present transmission provides four forward speed drives and one reverse drive between the drive shaft 11 and the driven shaft 12. The following table shows which clutches 13 and 14 and which brakes 16, 17 and 18 are engaged and which are disengaged during the establishment of each of the drives through the present transmission.

|  | Clutches | | Brakes | | |
|---|---|---|---|---|---|
|  | 13 | 14 | 16 | 17 | 18 |
| First | On | Off | Off | On | Off. |
| Second | On | Off | Off | Off | On. |
| Third | On | Off | On | Off | Off. |
| Direct | On | On | Off | Off | Off. |
| Reverse | Off | On | Off | On | Off. |

From the above table it is apparent that during the establishment of first or the lowest forward speed drive through the present transmission, the clutch 13 and the brake 17 are engaged while the other clutch 14 and the brake 16 and 18 are disengaged. Engagement of the brake 17 causes the planetary pinion carrier 39 to be held stationary in order to provide the necessary reaction element for the gear set during the completion of the low forward speed drive. Engagement of the clutch 13 completes a direct drive from the drive shaft 11 to the intermediate shaft 24 and thus the sun gear 34 is driven directly by the drive shaft 11. The sun gear 34 thus rotates in a forward direction and the power train to the driven shaft 12 proceeds through the pinions 35 and 36 to the ring gear 37 and thence to the driven shaft 12. Since the carrier 39 is held stationary at this time the forward rotation of the sun gear 34 imparts a reverse rotation to the pinions 35 and they in turn impart a forward rotation to the pinions 36, ring gear 37 and driven shaft 12.

Second or low intermediate forward speed drive between the shafts 11 and 12 is provided by the present transmission when the clutch 13 and the brake 18 are engaged while the other clutch 14 and the brakes 16 and 17 are disengaged. Engagement of the brake 18 causes the ring gear 40 to be held stationary in order to provide the necessary reaction element for the planetary gearing 15. The sun gear 34 is thus driven directly by the drive shaft 11 and in turn imparts a reverse rotation to the pinions 35. This reverse rotation of the pinions 35 causes them to walk around the ring gear 40 in a forward direction and due to this forward orbital movement of the pinions 35 and their reverse axial movement, forward rotation is imparted to the pinions 36 and they in turn drive the ring gear 37 and the driven shaft 12 in a forward direction. It will be seen that the reduction afforded by the second forward speed drive through the planetary gearing is less than that afforded during first forward speed drive for the reason that during the first forward speed drive the carrier 39 is stationary, whereas during second forward speed drive the carrier 39 rotates in a forward direction.

Third or high intermediate forward speed drive through the present transmission obtains when the clutch 13 and the brake 16 are engaged while the clutch 14 and the brakes 17 and 18 are disengaged. Engagement of the brake 16 causes the sun gear 33 to be held stationary in order to provide a reaction element for the planetary gear set and engagement of the clutch 13 causes the sun gear 34 to be driven in a forward direction directly by the drive shaft 11. The sun gear 34 thus imparts a reverse rotation to the pinions 35 and they in turn impart a forward rotation to the pinions 36 and the ring gear 37. The carrier 39 tends to be driven in a forward direction at this time and this forward rotation is at a higher ratio than during second forward speed drive because of the fact that the pinions 38, which mesh with the ring gear 37, walk around the stationary sun gear 33.

A direct or high forward speed drive between the shafts 11 and 12 is obtained when both of the clutches 13 and 14 are engaged while all of the brakes 16, 17 and 18 are disengaged. Engagement of both of the clutches 13 and 14 causes both sun gears 33 and 34 to be rotated directly by the drive shaft 11. Thus at this time there are two elements, namely the sun gears 33 and 34, of the planetary gear set 15 which are rotated in unison and in effect the planetary gear set 15 is locked up so that the ring gear 37 and the driven shaft 12 are also driven in a forward direction at the same speed as the sun gears 33 and 34 and the drive shaft 11.

Reverse drive through the present transmission is obtained when the clutch 14 and the brake 17 are engaged while the other clutch 13 and the brakes 16 and 18 are disengaged. Engagement of the brake 17 causes the planetary gear carrier 39 to be held stationary and engagement of the clutch 14 causes the sun gear 33 to be driven in a forward direction directly by the drive shaft 11. Thus the power train proceeds from the sun gear 33 through the pinion 38 to the ring gear 37 and thence to the driven shaft 12, the planetary gear carrier 39 being stationary and serving as the reaction element during reverse drive, and the pinions 38 serving to provide a torque reversal between the sun gear 33 and the ring gear 37.

From the foregoing description it is apparent that the present invention provides a transmission employing planetary gearing and friction clutches and brakes that will afford a sufficient range of driving ratios so as to render it particularly suitable for application to trucks. Because of the fact that friction brakes and clutches are utilized, the operation of the transmission is smooth and economical and lends itself particularly well to automatic operation.

In heavy duty truck transmissions it is very important that there be a relatively large spread between the different driving ratios in order to permit the truck to function properly under all of the operating conditions which it will be subjected to. It has been found that a four speed transmission providing driving ratios approximating a geometrical progression, wherein the highest driving ratio through the transmission is a direct or 1:1 drive and the lowest is of the order of 4.8:1, when used with a two speed driving axle affording 1:1 and 1.4:1 driving ratios, provides the necessary flexibility for heavy duty trucks. It has also been found that a progression factor between the transmission driving ratios of approximately 1.7 is also desirable as the four different transmission ratios are then of the order of 1:1, 1.7:1, 2.8:1 and 4.8:1, which provide the necessary reduction and variations between the ratios for rapid acceleration and smoothness of operation at cruising speeds. With the construction shown herein these four driving ratios are available.

In prior planetary gearing type transmissions with a similar number of controlling brakes and clutches attempts have been made to obtain substantially the same driving ratios as are available in the present transmission, but, because of the arrangement of the planetary gearing in these prior constructions, they have all had inherent disadvantages which have been overcome by the present transmission. The chief one of these disadvantages of such prior transmission constructions is that the relative sizes and number of teeth on the planetary pinions, sun gears and ring gears renders it impossible to obtain driving ratios of 1:1, 1.7:1, 2.8:1 and 4.8:1, and still utilize more than two of each type of planetary pinion in the gearing. When only two of each type of pinion are utilized, they are, of course, positioned 180 degrees apart and, in theory it would seem that the gearing would be balanced. It has been found in actual practice, however, that transmissions employing only two of each type of planetary pinion are not nearly so well balanced during operation as when three of each type of pinion is employed. It is therefore very advantageous to use three of each type of pinion, as contemplated in the present transmission.

In the prior art structures of the type which is shown in the patent to P. Ravigneaux, 2,220,174, for example, it is impossible to employ three of each type of pinion and yet obtain driving ratios of 1:1, 1.7:1, 2.8:1 and 4.8:1. This is due to the fact that the relative sizes and the number of teeth on the different gears necessary to provide these driving ratios will not permit the employment of more than two of each type of pinion. Consequently, to use this prior construction to provide the desired driving ratios may be done only by sacrificing the better balance obtainable when the present transmission is utilized to produce these driving ratios.

A feature of the present invention which is particularly desirable and advantageous is that a change may be made from one forward driving ratio to the next higher or next lower ratio by merely disengaging a single brake or clutch and engaging a single brake or clutch, it not being necessary to simultaneously or sequentially engage or disengage more than a single engageable member in order to effect a forward driving ratio change.

It is contemplated that numerous changes and modifications may be made in the present invention without departing from the spirit or scope thereof.

I claim:

1. In a transmission, the combination of a drive shaft, a driven shaft, planetary gearing including a plurality of elements consisting of a pair of sun gears, three sets of pinion gears, a ring gear connected with said driven shaft, and a planet pinion carrier, means for selectively connecting said sun gears to said drive shaft, means for barking one of said elements to complete a drive between said shafts through one of said sun gears, two of said sets of pinion gears and said ring gear when said one sun gear is connected to said drive shaft, and means for braking another of said elements to complete a drive between said shafts through the other sun gear, the other set of pinion gears and the ring gear when the other sun gear is connected to said drive shaft.

2. In a transmission, the combination of a drive shaft, a driven shaft, planetary gearing including a pair of sun gears, means for selectively connecting said sun gears to said drive shaft, said planetary gearing also including a ring gear connected with said driven shaft, a pair of meshing pinions which mesh respectively with one of said sun gears and with said ring gear, a third pinion meshing with the other sun gear and with said ring gear and a planet gear carrier for rotatably mounting all of said pinions, and braking means for said planet gear carrier for completing a forward drive between said shafts through said planetary gearing when said connecting means is effective to connect said one sun gear with said drive shaft and for completing a reverse drive between said shafts when said connecting means is effective to connect said other sun gear with said drive shaft.

3. In a transmission, the combination of a drive shaft, a driven shaft, planetary gearing including a plurality of elements consisting of a pair of sun gears, three sets of pinion gears, a ring gear connected with said driven shaft, and a pinion carrier, means for selectively connecting said sun gears to said drive shaft, means for braking one of said elements when said one sun gear is connected to said drive shaft to complete a drive between said shafts through one of said sun gears, through at least two of said plurality of sets of pinion gears and through said ring gear, and means for braking another of said elements when said other sun gear is connected to said drive shaft to complete a drive between said shafts through the other sun gear, through the third set of said pinion gears and through said ring gear.

References Cited in the file of this patent

UNITED STATES PATENTS

| 1,984,235 | Sharpe | Dec. 11, 1934 |
| 2,220,174 | Ravigneaux | Nov. 5, 1940 |
| 2,540,639 | Winther et al. | Feb. 6, 1951 |

FOREIGN PATENTS

| 48,019 | France | June 29, 1937 |
| 809,102 | France | Dec. 3, 1936 |
| 929,571 | France | July 15, 1947 |